United States Patent
Rajagopal et al.

(10) Patent No.: US 11,698,285 B2
(45) Date of Patent: Jul. 11, 2023

(54) MONITORING DISPENSATION OF A SUBSTANCE

(71) Applicant: KYNDRYL, INC., New York, NY (US)

(72) Inventors: Harish Rajagopal, Holsworthy (AU); Michael John Lyons, Strathdale (AU); Baiju Dhirajlal Mandalia, Boca Raton, FL (US)

(73) Assignee: KYNDRYL, INC., New York, NY (US)

( * ) Notice: Subject to any disclaimer, the term of this patent is extended or adjusted under 35 U.S.C. 154(b) by 78 days.

(21) Appl. No.: 16/732,420

(22) Filed: Jan. 2, 2020

(65) Prior Publication Data

US 2021/0207991 A1    Jul. 8, 2021

(51) Int. Cl.
*G01G 17/06* (2006.01)
*B67D 7/08* (2010.01)

(52) U.S. Cl.
CPC ............ *G01G 17/06* (2013.01); *B67D 7/08* (2013.01)

(58) Field of Classification Search
CPC .... B67D 1/1225; B67D 1/1227; B67D 1/124; B67D 7/08; B65B 3/28; G01G 17/06
USPC ............................................. 141/83; 702/173
See application file for complete search history.

(56) References Cited

U.S. PATENT DOCUMENTS

| 4,778,450 A | * | 10/1988 | Kamen | ............. | A61M 5/16895 128/DIG. 13 |
| 4,826,273 A | | 5/1989 | Tinder et al. | | |
| 6,334,471 B1 | * | 1/2002 | Graffin | ................... | B67C 3/202 141/1 |
| 8,793,729 B2 | | 7/2014 | Adimatyam et al. | | |
| 8,966,368 B2 | | 2/2015 | Kuramura | | |

(Continued)

FOREIGN PATENT DOCUMENTS

| CN | 102548892 B | 1/2015 |
| EP | 3218008 A1 | 9/2017 |

OTHER PUBLICATIONS

Mell et al., "The NIST Definition of Cloud Computing", Recommendations of the National Institute of Standards and Technology, Sep. 2011, 7 pages.

*Primary Examiner* — Mary E McManmon
*Assistant Examiner* — Christopher M Afful
(74) *Attorney, Agent, or Firm* — Erik Swanson; Andrew M. Calderon; Calderon Safran & Cole, P.C.

(57) ABSTRACT

A method can include obtaining a first weight measurement of a receptacle and obtaining a second weight measurement of the receptacle. The method can further include calculating a first difference between the first weight measurement and the second weight measurement, resulting in a reference dispensation value. The method can further include obtaining dispensation data, the dispensation data including a measured dispensation value. The measured dispensation value can correspond to a quantity of a substance dispensed from the receptacle, the quantity of the substance passing through a dispensation monitor coupled to the receptacle. The method can further include calculating a second difference between the reference dispensation value and the measured dispensation value. The method can further include determining that the second difference exceeds a threshold and adjusting the dispensation monitor in response to determining that the second difference exceeds the threshold.

20 Claims, 8 Drawing Sheets

(56) References Cited

U.S. PATENT DOCUMENTS

| | | | |
|---|---|---|---|
| 9,051,163 B2* | 6/2015 | Mehus | B67D 7/224 |
| 9,199,035 B2 | 12/2015 | Shih et al. | |
| 9,501,624 B2 | 11/2016 | Vishnubhatla et al. | |
| 2004/0102741 A1 | 5/2004 | Paulhus | |
| 2009/0304055 A1* | 12/2009 | Nino | H04W 24/02 |
| | | | 375/222 |
| 2012/0232746 A1 | 9/2012 | Wiederwohl | |
| 2014/0244768 A1 | 8/2014 | Shuman et al. | |
| 2014/0360621 A1* | 12/2014 | Clusserath | B65B 3/28 |
| | | | 141/9 |
| 2015/0019643 A1 | 1/2015 | Balassanian et al. | |
| 2015/0201795 A1* | 7/2015 | Tinkler | A47J 31/5253 |
| | | | 426/231 |
| 2015/0222572 A1 | 8/2015 | Vendrow et al. | |
| 2016/0005668 A1* | 1/2016 | Donner | H01L 21/563 |
| | | | 222/1 |
| 2017/0255760 A1 | 9/2017 | Lee et al. | |
| 2017/0275146 A1* | 9/2017 | Hollister | B67D 1/0888 |
| 2018/0177945 A1* | 6/2018 | Sims | A61M 5/16827 |

* cited by examiner

MONITORING DISPENSATION OF A SUBSTANCE

BACKGROUND

The present disclosure relates to dispensation of a substance, and more specifically, to monitoring dispensation of a substance.

In some applications, it may be desirable to dispense a predetermined quantity of a substance stored in a receptacle. For example, a mechanical actuator can be used to dispense a predetermined quantity of fluid from a receptacle containing the fluid. A displacement of the mechanical actuator can correspond to the predetermined quantity of the fluid dispensed. In some instances, a flow sensor can be used to measure a quantity of fluid dispensed.

SUMMARY

According to embodiments of the present disclosure, a method can include obtaining a first weight measurement of a receptacle. The method can further include obtaining a second weight measurement of the receptacle. The method can further include calculating a first difference between the first weight measurement and the second weight measurement, resulting in a reference dispensation value. The method can further include obtaining dispensation data. The dispensation data can include a measured dispensation value. The measured dispensation value can correspond to a quantity of a substance dispensed from the receptacle. The quantity of the substance can pass through a dispensation monitor coupled to the receptacle. The method can further include calculating a second difference between the reference dispensation value and the measured dispensation value. The method can further include determining that the second difference exceeds a threshold. The method can further include adjusting the dispensation monitor in response to determining that the second difference exceeds the threshold.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
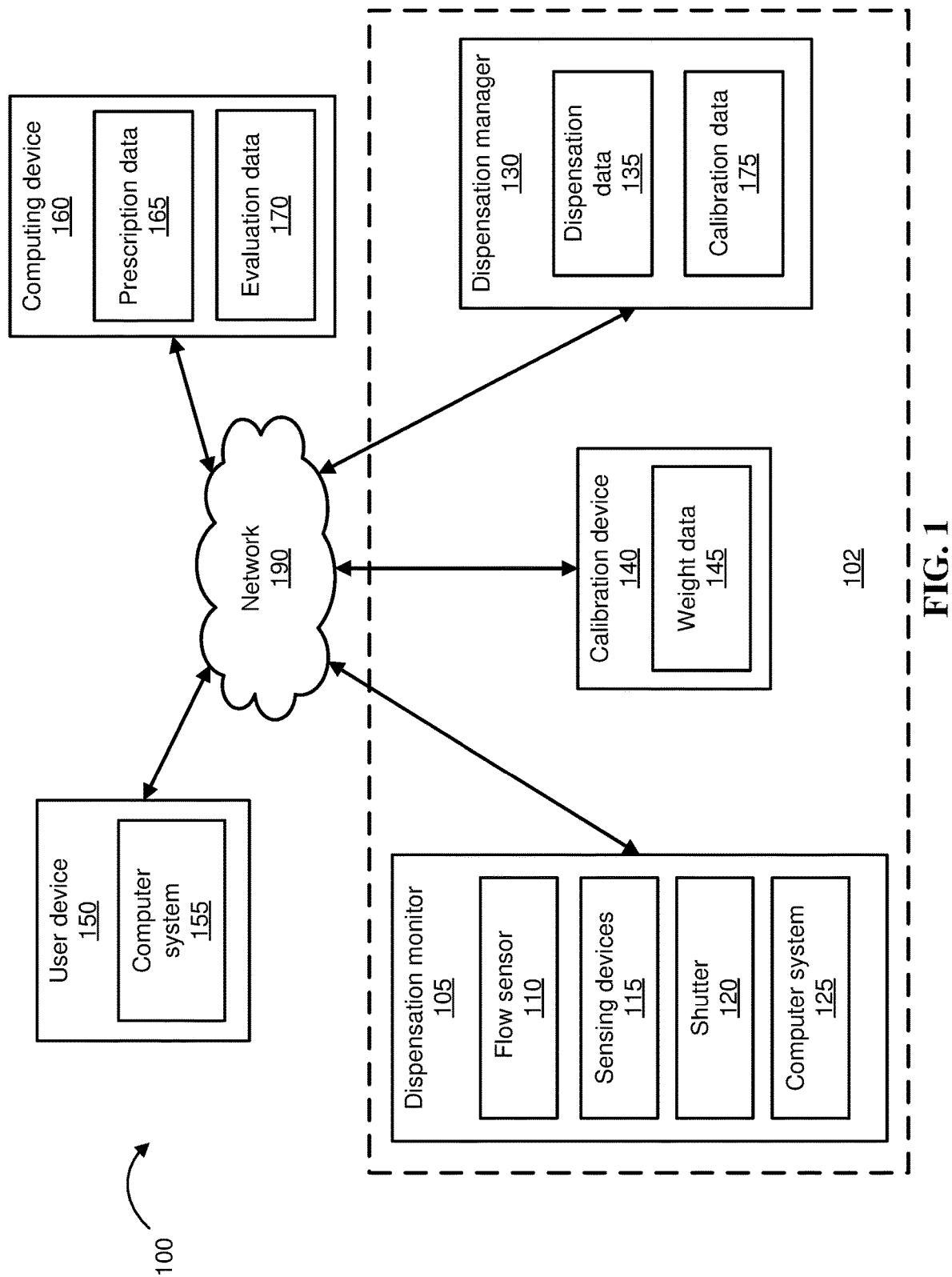
FIG. 1 depicts an example computing environment having a dispensation control system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to dispensation of a substance; more particular aspects relate to monitoring dispensation of a substance. While the present disclosure is not necessarily limited to such applications, various aspects of the disclosure may be appreciated through a discussion of various examples using this context.

Some medical procedures can include administering specific quantities of a substance for treatment. The substance can include a fluid such as a liquid, cream, paste, or gel. For example, a medical procedure can specify that a patient apply a predetermined quantity of a cream to an area of the patient's arm. The cream can be retained in a receptacle (e.g., a tubular container) and can be dispensed by manually applying pressure to (e.g., squeezing) the receptacle. The medical procedure can specify that the cream be stored at a temperature of approximately 3° C. The medical procedure can further specify that the predetermined quantity of cream be applied twice a day until the receptacle is empty.

This example medical procedure can present a number of challenges. First, the patient can have difficulty determining when he or she has manually dispensed the predetermined quantity of the cream. Consequently, the patient can have difficulty consistently dispensing the predetermined quantity of the cream. Additionally, a medical professional can have difficulty assessing the effectiveness of the treatment due to uncertainty in the patient's ability to follow the medical procedure, including storing the cream at the specified temperature.

To address these and other challenges, embodiments of the present disclosure include a dispensation control system. The dispensation control system includes a dispensation monitor that can monitor a quantity of a substance that is manually dispensed from a receptacle. The dispensation control system further includes a dispensation manager that can calibrate the dispensation monitor and can determine when a threshold quantity of the substance is dispensed. The dispensation control system further includes a calibration device that can provide weight data to the dispensation manager for calibration.

Embodiments of the present disclosure can facilitate accurate manual dispensations of a substance from a receptacle. Embodiments of the present disclosure can monitor parameters of an environment in which the receptacle is stored to identify whether a substance retained in the receptacle may be affected by the parameters. Embodiments of the present disclosure can permit a medical professional to observe a patient's adherence to a medical procedure and assess an effectiveness of the medical procedure.

Turning to the figures, FIG. 1 illustrates a computing environment 100 for monitoring dispensation of a substance, in accordance with embodiments of the present disclosure. The computing environment 100 includes a dispensation control system 102, user device 150, computing device 160, and a network 190. The dispensation control system 102 includes a dispensation monitor 105, calibration device 140, and a dispensation manager 130. The dispensation monitor 105 includes a flow sensor 110 and a computer system 125. In some embodiments, the dispensation monitor 105 can include one or more sensing devices 115 and/or a shutter 120. In some embodiments, the dispensation monitor 105 can be configured identically or substantially similarly to the dispensation monitor 210 discussed with respect to FIG. 2. In some embodiments, the computer system 125 can be identical or substantially similar to the computer system 601 discussed with respect to FIG. 6.

Referring back to FIG. 1, the dispensation manager 130 can perform one or more operations of method 300 and/or one or more operations of method 400. In some embodiments, the dispensation manager 130 can be included in the computer system 125 of the dispensation monitor 105. In some embodiments, the dispensation manager 130 can be configured to obtain and store dispensation data 135. Dispensation data 135 can include information such as a set of flow rates measured by the flow sensor 110, a set of measured dispensation values (e.g., a set of quantities of a substance dispensed from a receptacle), and dates, times and/or time intervals when a substance was dispensed from a receptacle. In some embodiments, the flow sensor 110 can calculate a set of measured dispensation values based, in part, on a set of flow rates measured by the flow sensor 110. In some embodiments, the dispensation manager 130 can calculate a set of measured dispensation values based, in part, on a set of flow rates the dispensation manager 130 obtains from the flow sensor 110. In some embodiments, the dispensation manager 130 can manage calibration data 175. Calibration data 175 can include a set of correlations (e.g., a set of correction factor values) between a set of measured dispensation values and a set of reference dispensation values. (Such correlations are discussed further with respect to FIG. 3 below).

The calibration device 140 can include a precision scale that is configured to obtain weight data 145. Weight data 145 can include a set of weight measurements of one or more objects placed onto the calibration device 140.

The computing environment 100 can include a user device 150, such as a mobile phone, laptop computer, tablet, desktop computer, and the like. The user device 150 can include a computer system 155 that can be identical or substantially similar to the computer system 601 discussed with respect to FIG. 6. In some embodiments, the dispensation manager 130 can be included in the computer system 155 of the user device 150.

The computing environment 100 can include a computing device 160, such as a secure data server. The computing device 160 can include a computer system such as the computer system 601 discussed with respect to FIG. 6. The computing device 160 can be configured to store and transmit prescription data 165 and/or evaluation data 170. In some embodiments, prescription data 165 can include a set of instructions to be performed by a patient to complete a medical procedure. For example, prescription data 165 can include instructions for a patient to apply a specified quantity of a gel to the patient's neck once a day for a period of 3 weeks. In some embodiments, prescription data 165 can include information about a substance to be used for medical treatment. For example, in some embodiments, the prescription data 165 can include a temperature at which the substance is to be stored to maintain its viability. In some embodiments, the prescription data 165 can include a threshold humidity level, above which, the density of the substance can change. In some embodiments, the prescription data 165 can include information about various properties of the substance, such as a density value, a potency value, and/or a half-life of a substance used in a nuclear medicine procedure. In some embodiments, the prescription data 165 can include a manufacturing batch number that corresponds to a substance that has a particular set of properties.

In some embodiments, evaluation data 170 can include anonymized data obtained from a plurality of dispensation control systems 102. Evaluation data 170 can include data such as prescription data 165 and/or dispensation data 135. In these embodiments, the computing device 160 can use the evaluation data 170 for analyses such as identifying trends in patients' usage of a dispensed substance. In some embodiments, such analyses can include correlating the effectiveness of a medical treatment with the dispensation data 135 from the plurality of dispensation control systems 102. In some embodiments, the user device 150 can obtain the evaluation data 170 (e.g., the computing device 160 can transmit the evaluation data 170 to the user device 150 through the network 190), and the user device 150 can analyze the evaluation data 170.

In some embodiments, the computing environment 100 can include one or more of each of the dispensation monitor 105, calibration device 140, dispensation manager 130, user device 150, computing device 160, and network 190. In some embodiments, the dispensation monitor 105, calibration device 140, dispensation manager 130, user device 150, and computing device 160 can exchange data with one another through a network 190. In some embodiments, the network 190 can be a wide area network (WAN), the Internet, or an intranet. In some embodiments, the network 190 can be identical or substantially similar to cloud computing environment 50 described in FIG. 7.

Figure 2:
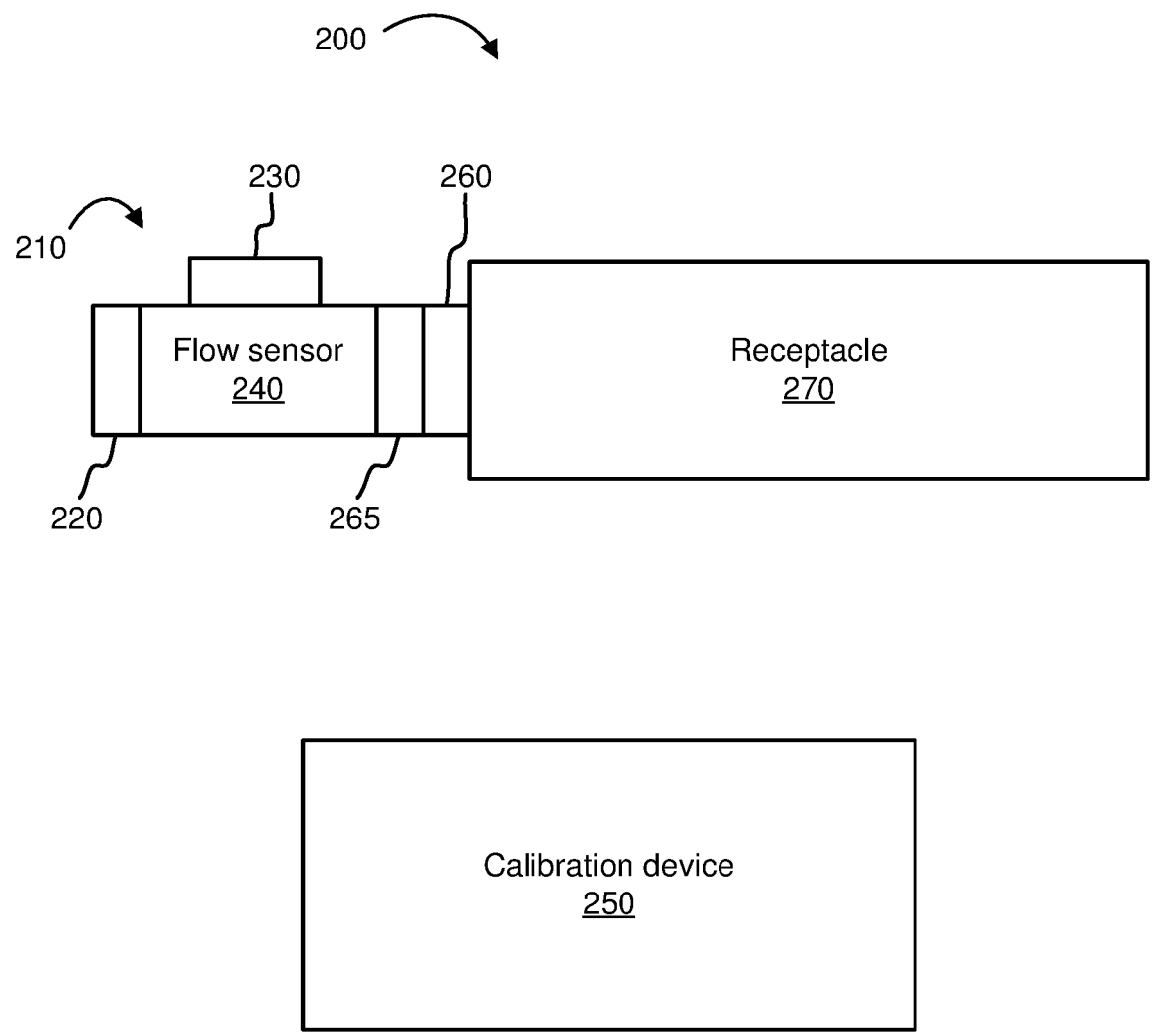
FIG. 2 depicts an example dispensation monitoring assembly and an example calibration device, in accordance with embodiments of the present disclosure.

FIG. 2 depicts an example dispensation monitoring assembly 200 and an example calibration device 250, in accordance with embodiments of the present disclosure. The dispensation monitoring assembly 200 includes a receptacle 270 having a receptacle opening 260 and a dispensation monitor 210 removably coupled to the receptacle 270. The receptacle 270 can retain a substance (not shown). The substance can include a fluid such as a liquid, cream, paste, or gel. In some embodiments, the substance can be used for medical treatment (e.g., to address a skin condition, such as a rash or lesion, a muscle or joint condition, and the like). The receptacle 270 can include a flexible tubular portion that can receive pressure (e.g., that can be squeezed) to dispense the substance from the receptacle through the receptacle opening 260.

In some embodiments, the dispensation monitor 210 can be removably coupled to the receptacle 270 at the receptacle opening 260. For example, in some embodiments, the dispensation monitor 210 can include a coupling 265. In these embodiments, the coupling 265 can include a coupling feature, such as a set of internal threads that engage a set of external threads on the receptacle opening 260 to removably couple the dispensation monitor 210 to the receptacle 270. In some embodiments, the coupling 265 can include one or more sealing members, such as gaskets, to prevent leakage of the substance between the coupling 265 and the receptacle opening 260.

The dispensation monitor 210 includes a flow sensor 240 that is configured to measure a flow rate of the substance as it passes from the receptacle 270 through the flow sensor 240. For example, in some embodiments, the flow sensor 240 can include a set of ultrasonic transducers that can measure a volumetric flow rate of the substance as it passes through the flow sensor 240. In some embodiments, the flow sensor 240 can measure a mass flow rate. In some embodiments, the dispensation monitor 210 can be configured to transmit a signal when a flow rate exceeds a threshold. In some embodiments, the signal can include an alert to a user (e.g., to a user device, such as user device 150 discussed with respect to FIG. 1) indicating that a threshold quantity of the substance has been dispensed. In some embodiments, the signal can include a command to a shutter 220 to transition between an open state and a closed state (discussed further below). In some embodiments, the dispensation monitor 210 can be configured to emit an audible sound and/or illuminate a visible display, such as a set of light emitting diodes, to indicate that a threshold quantity of the substance has been dispensed.

In some embodiments, the dispensation monitor 210 can include a set of sensing devices 230. For example, in some embodiments, the set of sensing devices 230 can include at least one of a temperature sensor, humidity sensor, or a vibration sensor. In these embodiments, the set of sensing devices 230 can measure a set of parameters that can affect the viability of the substance. For example, in some embodiments, the substance may experience a loss of potency if the receptacle 270 is stored in an environment having a temperature that is above a threshold temperature. In another example, the substance may experience a change in its density when it is subject to predetermined ambient humidity levels. In another example, the composition and/or potency of the substance may change if the receptacle 270 containing the substance is subject to a vibration that exceeds a threshold. Thus, by using the set of sensing devices 230, the dispensation monitor 210 can obtain and transmit information that can affect a medical treatment plan. For example, if a substance is handled and/or stored in such a manner that it experiences a loss of potency, a medical treatment plan can be modified such that a larger quantity of the substance is prescribed or a replacement receptacle of the substance is prescribed.

In some embodiments, the dispensation monitor 210 can include a shutter 220. The shutter 220 can be configured to transition between an open state and a closed state. For example, in an open state, the shutter 220 can include a set of barriers that are positioned to allow the substance to be dispensed from the receptacle 270 and out of the flow sensor 240. Continuing with this example, in a closed state, the shutter 220 can include a set of barriers that are positioned to inhibit the substance from being dispensed from the receptacle 270 and out of the flow sensor 240. In some embodiments, the dispensation monitor 210 can be configured the same or substantially similarly to the dispensation monitor 105 discussed with respect to FIG. 1.

Calibration device 250 can include a precision scale that can obtain and transmit a set of weight measurements of the dispensation monitoring assembly 200. In some embodiments, the calibration device 250 can be configured identically or substantially similarly to the calibration device 140 discussed with respect to FIG. 1.

Figure 3:
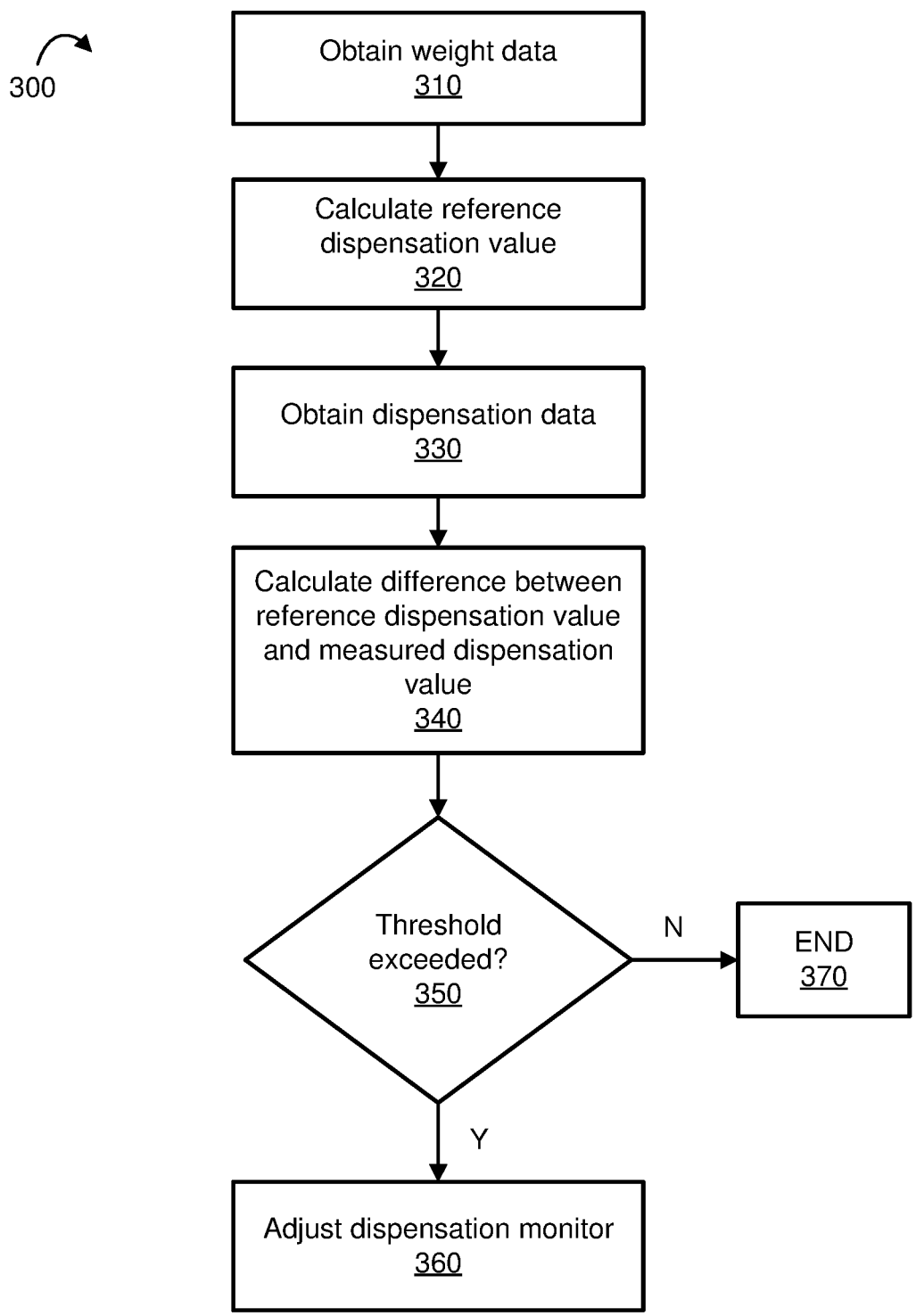
FIG. 3 depicts a flowchart of an example calibration method, in accordance with embodiments of the present disclosure.

FIG. 3 illustrates a flowchart of an example method 300 for adjusting a dispensation monitor, in accordance with embodiments of the present disclosure. In some embodiments, adjusting the dispensation monitor can include calibrating the dispensation monitor such that a difference between a measured dispensation value and a reference dispensation value does not exceed a threshold (this is discussed in further detail below). The dispensation monitor can be a device such as the dispensation monitor 105 discussed with respect to FIG. 1. In some embodiments, method 300 can be executed by a dispensation manager, such as the dispensation manager 130 discussed with respect to FIG. 1.

In operation 310, the dispensation manager can obtain weight data. Weight data can include a set of weight measurements measured by a calibration device, such as the calibration device 140 discussed with respect to FIG. 1. For example, in some embodiments, the weight data can include an initial weight measurement of a receptacle and/or an initial weight measurement of a dispensation monitoring assembly. The initial weight can indicate a weight prior to a dispensation of a substance from the receptacle. The weight data can also include a set of weight measurements of the receptacle and/or the dispensation monitoring assembly after each dispensation of the substance from the receptacle.

In operation 320, the dispensation manager can calculate a reference dispensation value. The reference dispensation value can indicate a quantity of the substance that has been dispensed from the receptacle or from the dispensation monitoring assembly. Calculating the reference dispensation value can include calculating a difference between a first weight measurement and a second, subsequent weight measurement. Such a calculated difference can indicate a weight quantity of the substance that has been dispensed between the time of the first weight measurement and the time of the second, subsequent weight measurement.

In operation 330, the dispensation manager can obtain dispensation data. Dispensation data can include information such as a set of flow rates measured by a flow sensor of the dispensation monitor. In some embodiments, operation 330 can include the dispensation manager using the set of flow rates to calculate a set of measured dispensation values (e.g., a set of quantities of a substance dispensed from a receptacle, the set of quantities based on measured flow rates). In these embodiments, the dispensation manager can calculate the set of measured dispensation values using known relationships between density, mass, and volume as well as the set of flow rates and time intervals of flow obtained from the dispensation monitor.

In operation 340, the dispensation manager can calculate a difference between a reference dispensation value and a measured dispensation value.

In operation 350, the dispensation manager can determine whether the difference exceeds a threshold. For example, a percentage difference of 5% can be a predetermined threshold. Such a threshold can be selected based on a determination that the dispensation monitor is sufficiently accurate and need not be calibrated unless the threshold is exceeded. Continuing with this example, if in operation 340 the dispensation manager calculates a percentage difference of 3%, the dispensation manager can proceed to operation 370 and end the method 300. Alternatively, if the threshold is exceeded, e.g., in operation 340 the dispensation manager calculates a percentage difference of 8%, the dispensation manager can proceed to operation 360.

In operation 360, the dispensation manager can adjust the dispensation monitor. In some embodiments, adjusting the dispensation monitor can include changing a correlation between a measured dispensation value and a reference dispensation value. For example, in some embodiments, a correction factor can be added to a flow rate measured by the dispensation monitor. In these embodiments, the correction factor can prevent subsequent measured dispensation values from exceeding a threshold in operation 350.

Figure 4:
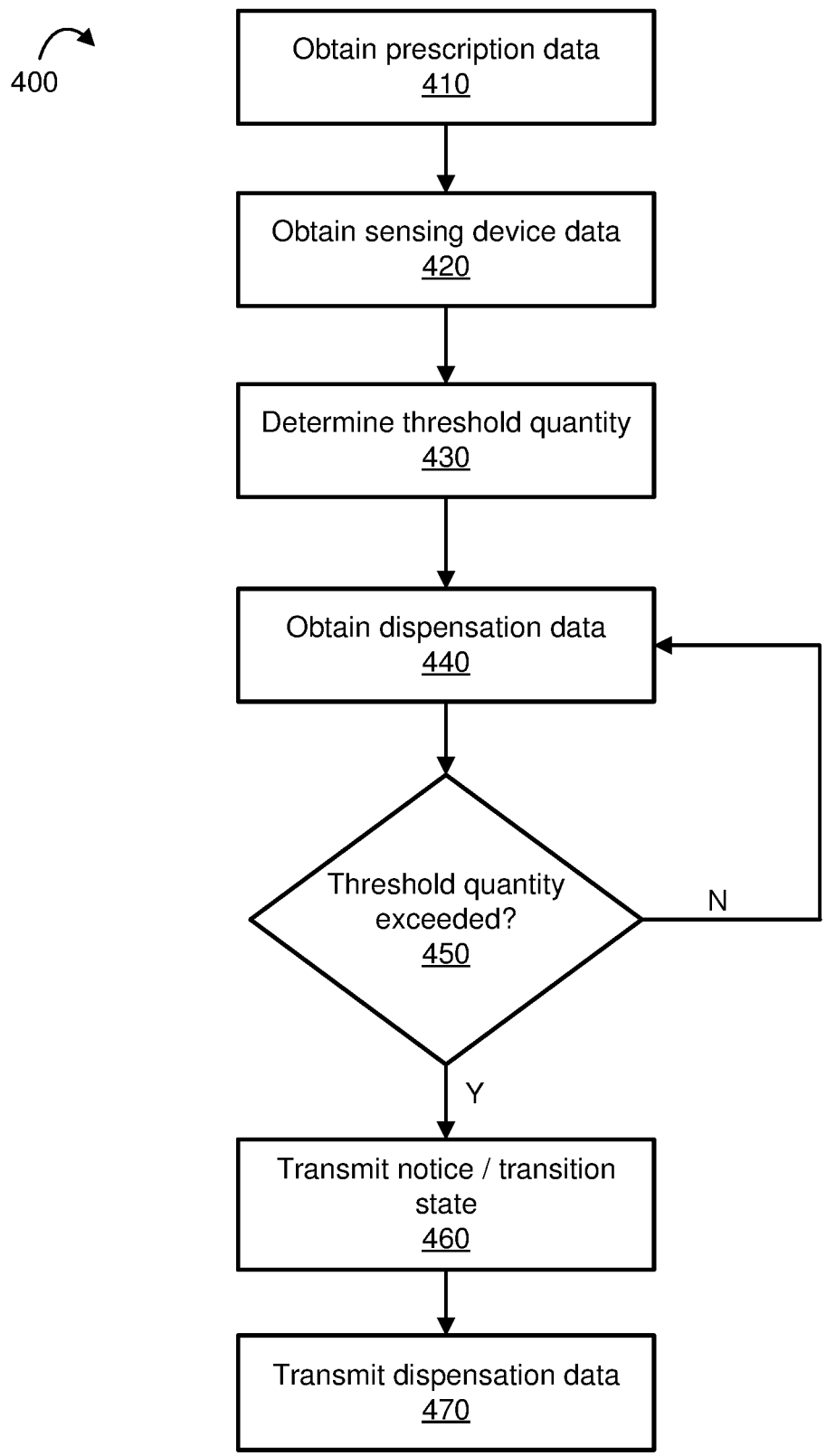
FIG. 4 depicts a flowchart of an example dispensation control method, in accordance with embodiments of the present disclosure.

FIG. 4 illustrates a flowchart of an example method 400 for controlling dispensation of a substance, in accordance with embodiments of the present disclosure. In some embodiments, method 400 can be executed by a dispensation manager, such as the dispensation manager 130 discussed with respect to FIG. 1.

In operation 410, the dispensation manager can obtain prescription data for a user. For example, the dispensation manager can obtain medical treatment instructions for the user. The medical treatment instructions can include instructions for the user to apply a quantity of a prescribed cream to the user's leg once a day. Further in this example, the prescription data can include properties of the prescribed cream, such as a recommended storage temperature range.

In operation 420, the dispensation manager can obtain sensing device data. Sensing device data can include parameter measurements (e.g., temperature, humidity, and/or vibration) obtained by one or more sensing devices, such as sensing devices 230 discussed with respect to FIG. 2. Continuing with the example discussed above, the dispensation manager can obtain temperature measurements from a dispensation monitoring assembly, such as the dispensation monitoring assembly 200 discussed with respect to FIG. 2. The temperature measurements can indicate that a receptacle retaining the prescribed cream has periodically been stored at a temperature outside of the recommended storage temperature range.

In operation 430, the dispensation manager can determine a threshold quantity of the prescribed cream that the user should dispense and use for the user's medical treatment. Continuing with the example above, in determining the threshold quantity, the dispensation manager can modify a dispensation quantity specified in the medical treatment instructions to account for the receptacle retaining the prescribed cream being periodically stored outside of the recommended storage temperature range. For example, in response to the temperature measurements obtained in operation 420, the dispensation manager can obtain a set of correlations between the potency of the prescribed cream and the storage temperature of the prescribed cream. In some embodiments, the dispensation manager can obtain such correlations from a secure data server (e.g., computing device 160 discussed with respect to FIG. 1). Based on the set of correlations, the dispensation manager can determine that the storage of the prescribed cream outside of the recommended storage temperature range likely reduced the potency of the prescribed cream. Accordingly, upon confirmation by a medical professional, the dispensation manager can determine a threshold quantity that is greater than the dispensation quantity specified in the medical treatment instructions.

In operation 440, the dispensation manager can obtain dispensation data. Continuing with the example discussed above, the dispensation data can include a real-time measured dispensation value corresponding to a quantity of the cream dispensed from the dispensation monitoring assembly.

In operation 450, the dispensation manager can determine whether the threshold quantity is exceeded. If the threshold quantity is not exceeded, the dispensation manager can proceed to operation 440 and continue obtaining dispensation data. Alternatively, if the threshold quantity is exceeded, the dispensation manager can proceed to operation 460.

In operation 460, the dispensation manager can transmit a notice indicating that the threshold quantity is exceeded. Such a notice can include an audible sound, a visible display, and/or an alert to a user device, such as the user device 150 discussed with respect to FIG. 1. In some embodiments, in operation 460, the dispensation manager can command a shutter (e.g., the shutter 220 discussed with respect to FIG. 2) to transition from an open state to a closed state.

In some embodiments, with a user's informed consent, operation 470 can include the dispensation manager can transmitting dispensation data to a user device (e.g., the user device 150 discussed with respect to FIG. 1) or to a computing device (e.g., the computing device 160 discussed with respect to FIG. 1). Such dispensation data can include a quantity of the cream dispensed from the dispensation monitoring assembly.

Figure 5:
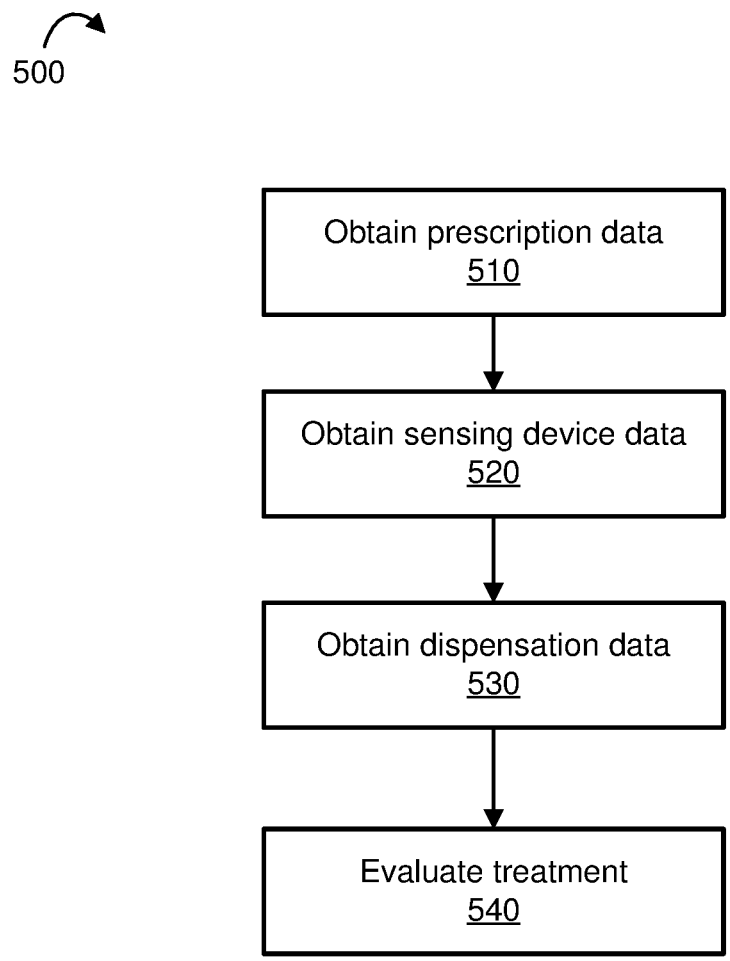
FIG. 5 depicts a flowchart of an example method for evaluating dispensation data, in accordance with embodiments of the present disclosure.

FIG. 5 illustrates a flowchart of an example method 500 for evaluating dispensation data, in accordance with embodiments of the present disclosure. In some embodiments, method 500 can be performed by a user device, such as user device 150 described with respect to FIG. 1. In some embodiments, method 500 can be performed by a computing device, such as computing device 160 described with respect to FIG. 1. Method 500 can use anonymized data such that no personally identifiable information is included in the evaluation.

In operation 510, the computing device can obtain a set of prescription data. The prescription data can correspond to a plurality of medical treatment plans. In some embodiments, the prescription data can include sets of manufacturing batch numbers that correspond to sets of receptacles of a prescribed substance, such as an ointment.

In operation 520, the computing device can obtain sensing device data from a plurality of dispensation monitoring assemblies that include receptacles of the prescribed substance. For example, in some embodiments, the computing device can obtain humidity measurements from the plurality of dispensation monitoring assemblies.

In operation 530, the computing device can obtain dispensation data from the plurality of dispensation monitoring assemblies that include receptacles of the prescribed substance. The dispensation data can include quantities of the prescribed substance dispensed from respective dispensation monitoring assemblies.

In operation 540, the computing device can evaluate a medical treatment corresponding to the prescribed substance. For example, the computing device can analyze trends, such as whether a prescribed substance corresponding to a particular batch number was dispensed in higher quantities during a corresponding medical treatment. In another example, the computing device can analyze whether humidity tends to affect the effectiveness of a medical treatment (e.g., whether a potency of an ointment is reduced in humid environments, such that the medical treatment is less effective when used in environments above a threshold humidity level). By obtaining data from a plurality of dispensation monitoring assemblies, embodiments of the present disclosure can perform thorough evaluations of medical treatments based on accurate measurements of a prescribed substance used, as well as conditions under which the prescribed substance is used.

Figure 6:
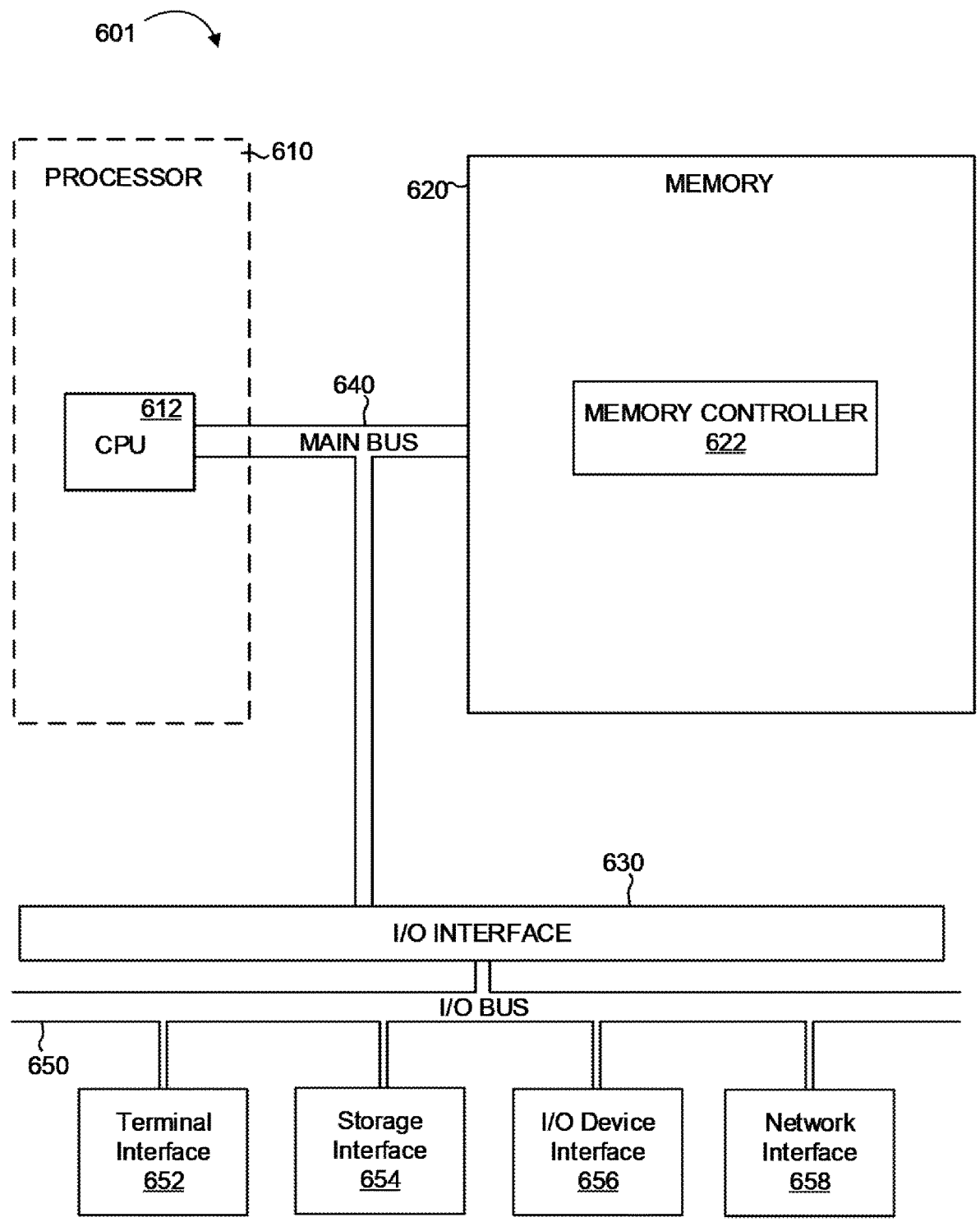
FIG. 6 depicts the representative major components of a computer system that can be used in accordance with embodiments of the present disclosure.

FIG. 6 depicts the representative major components of an exemplary Computer System 601 that can be used in accordance with embodiments of the present disclosure. The particular components depicted are presented for the purpose of example only and are not necessarily the only such variations. The Computer System 601 can comprise a Processor 610, Memory 620, an Input/Output Interface (also referred to herein as I/O or I/O Interface) 630, and a Main Bus 640. The Main Bus 640 can provide communication pathways for the other components of the Computer System 601. In some embodiments, the Main Bus 640 can connect to other components such as a specialized digital signal processor (not depicted).

The Processor 610 of the Computer System 601 can be comprised of one or more CPUs 612. The Processor 610 can additionally be comprised of one or more memory buffers or caches (not depicted) that provide temporary storage of instructions and data for the CPU 612. The CPU 612 can perform instructions on input provided from the caches or from the Memory 620 and output the result to caches or the Memory 620. The CPU 612 can be comprised of one or more circuits configured to perform one or methods consistent with embodiments of the present disclosure. In some embodiments, the Computer System 601 can contain multiple Processors 610 typical of a relatively large system. In other embodiments, however, the Computer System 601 can be a single processor with a singular CPU 612.

The Memory 620 of the Computer System 601 can be comprised of a Memory Controller 622 and one or more memory modules for temporarily or permanently storing data (not depicted). In some embodiments, the Memory 620 can comprise a random-access semiconductor memory, storage device, or storage medium (either volatile or non-volatile) for storing data and programs. The Memory Controller 622 can communicate with the Processor 610, facilitating storage and retrieval of information in the memory modules. The Memory Controller 622 can communicate with the I/O Interface 630, facilitating storage and retrieval of input or output in the memory modules. In some embodiments, the memory modules can be dual in-line memory modules.

The I/O Interface 630 can comprise an I/O Bus 650, a Terminal Interface 652, a Storage Interface 654, an I/O Device Interface 656, and a Network Interface 658. The I/O Interface 630 can connect the Main Bus 640 to the I/O Bus 650. The I/O Interface 630 can direct instructions and data from the Processor 610 and Memory 620 to the various interfaces of the I/O Bus 650. The I/O Interface 630 can also direct instructions and data from the various interfaces of the I/O Bus 650 to the Processor 610 and Memory 620. The various interfaces can comprise the Terminal Interface 652, the Storage Interface 654, the I/O Device Interface 656, and the Network Interface 658. In some embodiments, the various interfaces can comprise a subset of the aforementioned interfaces (e.g., an embedded computer system in an industrial application may not include the Terminal Interface 652 and the Storage Interface 654).

Logic modules throughout the Computer System 601—including but not limited to the Memory 620, the Processor 610, and the I/O Interface 630—can communicate failures and changes to one or more components to a hypervisor or operating system (not depicted). The hypervisor or the operating system can allocate the various resources available in the Computer System 601 and track the location of data in Memory 620 and of processes assigned to various CPUs 612. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
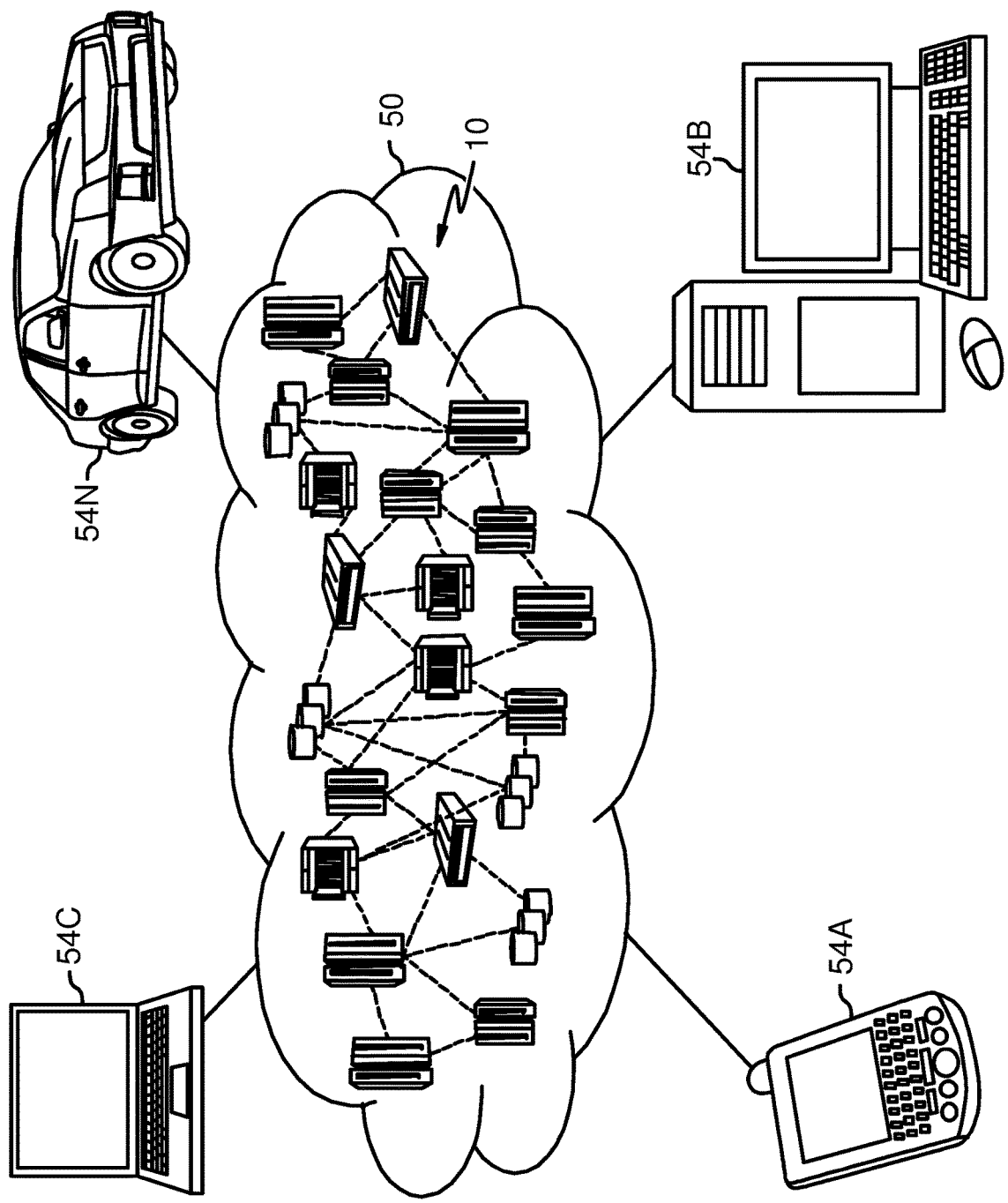
FIG. 7 depicts a cloud computing environment according to embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
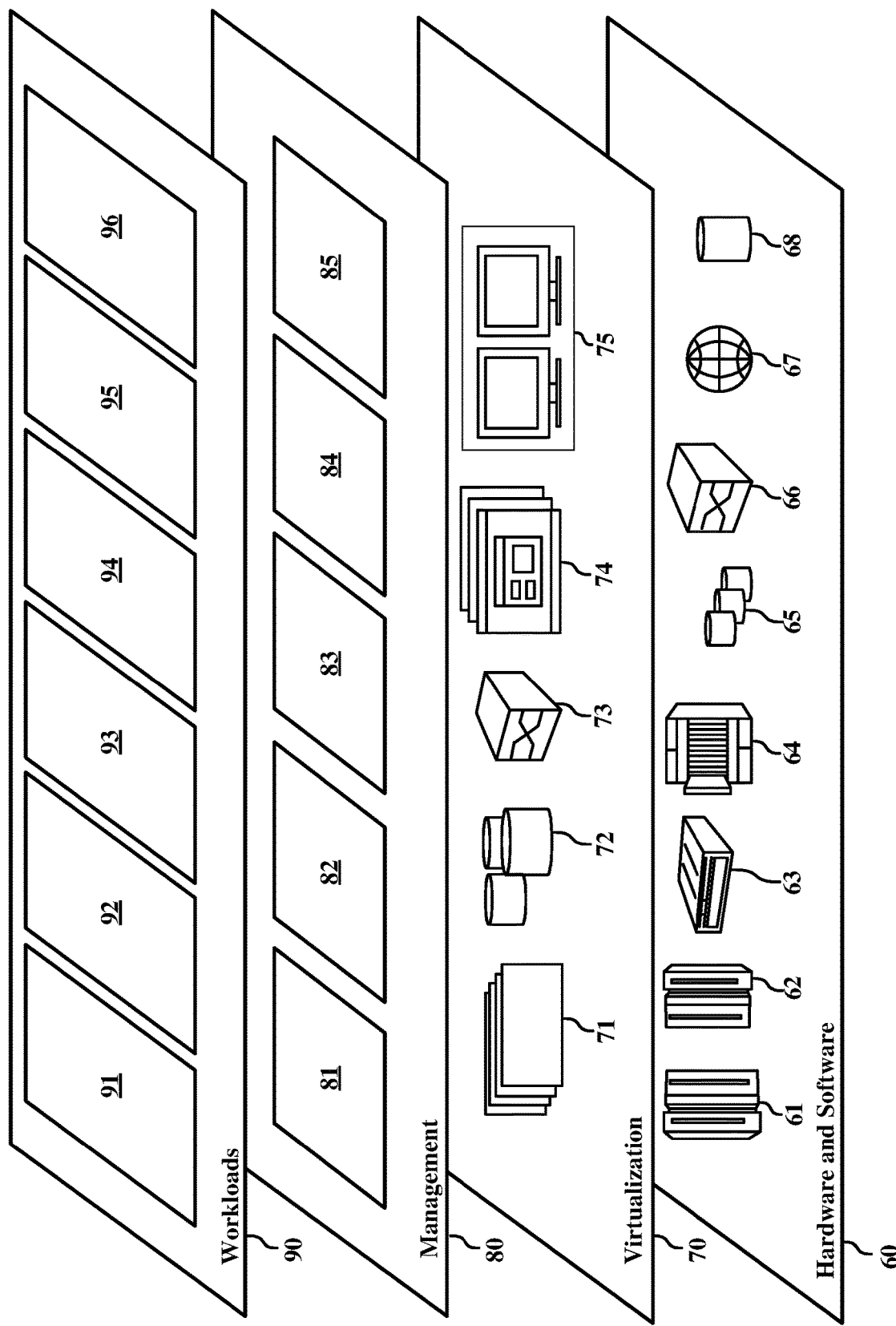
FIG. 8 depicts abstraction model layers according to embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and dispensation logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   generating a reference dispensation value corresponding to a weighed quantity of a substance manually dispensed from a receptacle, comprising:
   obtaining a first weight measurement of the receptacle indicating a weight prior to a dispensation of the substance from the receptacle,
   obtaining a second weight measurement of the receptacle indicating a weight of the substance in the receptacle after a portion of the substance has been dispensed from the receptacle after the first weight measurement, and
   calculating a first difference between the first weight measurement and the second weight measurement, resulting in the reference dispensation value indicating the weight of the substance dispensed from the receptacle between the first weight measurement and the second weight measurement;

determining that a dispensation monitor coupled to the receptacle requires calibration based on a determination that a measured dispensation value indicates that the dispensation monitor is insufficiently accurate, the dispensation monitor being insufficiently accurate based on a second difference between the reference dispensation value and the measured dispensation value exceeding a threshold quantity, the determining that the dispensation monitor requires calibration comprising:

obtaining dispensation data from the dispensation monitor, the dispensation data including the measured dispensation value, wherein the measured dispensation value corresponds to a predetermined quantity of the substance that has been dispensed from the receptacle that is specified in a medical procedure for treatment of a patient, the predetermined quantity of the substance passing through the dispensation monitor being calculated from known relationships between density, mass, volume, flow rates, and/or time intervals of flow obtained from the dispensation monitor, calculating the second difference between the reference dispensation value and the measured dispensation value, wherein the second difference indicates a difference in quantity of the substance dispensed from the receptacle, and determining that the second difference exceeds the threshold quantity of the substance indicating that the calibration is required and that the dispensation monitor is insufficiently accurate; and adjusting the dispensation monitor in response to determining that the second difference exceeds the threshold quantity.

2. The computer-implemented method of claim 1, wherein adjusting the dispensation monitor comprises changing a correlation between the measured dispensation value and the reference dispensation value preventing a difference between the reference dispensation value and the measured dispensation value from exceeding the threshold quantity, and wherein the threshold quantity is a predetermined threshold selected based on the determination that the dispensation monitor is sufficiently accurate.

3. The computer-implemented method of claim 1, wherein the dispensation monitor comprises a flow sensor, the flow sensor configured to measure the flow rates of the quantity of the substance passing through the dispensation monitor; wherein the measured dispensation value is based, at least in part, on the flow rates.

4. The computer-implemented method of claim 1, wherein the dispensation monitor includes a temperature sensor, the temperature sensor configured to measure a temperature of an environment in which the receptacle is located.

5. The computer-implemented method of claim 1, wherein the dispensation monitor includes a humidity sensor, the humidity sensor configured to measure a humidity of an environment in which the receptacle is located.

6. The computer-implemented method of claim 1, wherein the dispensation monitor includes a shutter, wherein the shutter is configured transition between an open state and a closed state; wherein in the open state, the shutter allows the substance to dispense from the receptacle; and wherein in the closed state, the shutter inhibits the substance from dispensing from the receptacle; and based on determining that the second difference exceeds a second threshold quantity, transmitting a notice to a user of a manual dispenser to stop dispensing the substance from the receptacle, wherein the second threshold quantity indicating the quantity of the substance dispensed exceeds the recommended quantity.

7. The computer-implemented method of claim 6, wherein the shutter is configured to transition from the open state to the closed state when the measured dispensation value exceeds the second threshold, further comprising:

continuing the obtaining of the dispensation data when the threshold quantity is not exceeded; and transmitting a notice when the threshold quantity is exceeded.

8. A system comprising:

a processor; and a memory in communication with the processor, the memory containing program instructions that, when executed by the processor, are configured to cause the processor to perform a method, the method comprising:

generating a reference dispensation value corresponding to a weighed quantity of a substance manually dispensed from a receptacle, comprising:

obtaining a first weight measurement of the receptacle indicating a weight prior to a dispensation of the substance from the receptacle, obtaining a second weight measurement of the receptacle indicating a weight of the substance in the receptacle after a portion of the substance has been dispensed from the receptacle after the first weight measurement, and calculating a first difference between the first weight measurement and the second weight measurement, resulting in the reference dispensation value indicating the weight of the substance dispensed from the receptacle between the first weight measurement and the second weight measurement;

determining that a dispensation monitor coupled to the receptacle requires calibration based on a determination that a measured dispensation value indicates that the dispensation monitor is insufficiently accurate, the dispensation monitor being insufficiently accurate based on a second difference between the reference dispensation value and the measured dispensation value exceeding a threshold quantity, the determining that the dispensation monitor requires calibration comprising:

obtaining dispensation data from a flow sensor of the dispensation monitor, the dispensation data including the measured dispensation value, wherein the measured dispensation value corresponds to a predetermined quantity of the substance that has been dispensed from the receptacle that is specified in a medical procedure for treatment of a patient, the predetermined quantity of the substance passing through the dispensation monitor being calculated from known relationships between density, mass, volume, flow rates, and/or time intervals of flow obtained from the dispensation monitor, calculating the second difference between the reference dispensation value and the measured dispensation value, wherein the second difference indicates a difference in quantity of the substance dispensed from the receptacle, and determining that the second difference exceeds the threshold quantity of the substance indicating that the calibration is required and that the dispensation monitor is insufficiently accurate; and adjusting the dispensation monitor in response to determining that the second difference exceeds the threshold quantity.

9. The system of claim 8, wherein adjusting the dispensation monitor comprises changing a correlation between the measured dispensation value and the reference dispensation value preventing a difference between the reference dispensation value and the measured dispensation value from exceeding the threshold quantity, the correlation being obtained from a secure data server.

10. The system of claim 8, wherein the dispensation monitor comprises a flow sensor, the flow sensor configured to measure the flow rates of the quantity of the substance passing through the dispensation monitor; wherein the measured dispensation value is based, at least in part, on the flow rates.

11. The system of claim 8, wherein the dispensation monitor includes a temperature sensor, the temperature sensor configured to measure a temperature of an environment in which the receptacle is located.

12. The system of claim 8, wherein the dispensation monitor includes a humidity sensor, the humidity sensor configured to measure a humidity of an environment in which the receptacle is located.

13. The system of claim 8, wherein the dispensation monitor includes a shutter, wherein the shutter is configured transition between an open state and a closed state; wherein in the open state, the shutter allows the substance to dispense from the receptacle; and wherein in the closed state, the shutter inhibits the substance from dispensing from the receptacle; and based on determining that the second difference exceeds a second threshold quantity, transmitting a notice to a user of the manual dispenser to stop dispensing the substance from the receptacle, the second threshold quantity indicating the quantity of the substance dispensed exceeds the recommended quantity.

14. The system of claim 13, wherein the shutter is configured to transition from the open state to the closed state when the measured dispensation value exceeds the second threshold.

15. A computer program product comprising a computer readable storage medium having program instructions embodied therewith, wherein the computer readable storage medium is not a transitory signal per se, the program instructions executable by a processor to cause the processor to perform a method, the method comprising:

generating a reference dispensation value corresponding to a weighed quantity of a substance that is manually dispensed from a receptacle, comprising:

obtaining a first weight measurement of the receptacle indicating a weight prior to a dispensation of the substance from the receptacle, obtaining a second weight measurement of the receptacle indicating a weight of the substance in the receptacle after a portion of the substance has been dispensed from the receptacle after the first weight measurement, and calculating a first difference between the first weight measurement and the second weight measurement, resulting in the reference dispensation value indicating the weight of the substance dispensed from the receptacle between the first weight measurement and the second weight measurement;

determining that a dispensation monitor coupled to the receptacle requires calibration based on a determination that a measured dispensation value indicates that the dispensation monitor is insufficiently accurate, the dispensation monitor being insufficiently accurate based on a second difference between the reference dispensation value and the measured dispensation value exceeding a threshold quantity, the determining that the dispensation monitor requires calibration comprising:

obtaining dispensation data from the dispensation monitor, the dispensation data including the measured dispensation value, wherein the measured dispensation value corresponds to a predetermined quantity of the substance that has been dispensed from the receptacle that is specified in a medical procedure for treatment of a patient, the predetermined quantity of the substance passing through the dispensation monitor being calculated from known relationships between density, mass, volume, flow rates, and/or time intervals of flow obtained from the dispensation monitor, wherein the dispensation data includes the flow rates, quantities of the substance dispensed from the receptacle, and/or times for when the substance was dispensed, calculating the second difference between the reference dispensation value and the measured dispensation value, wherein the second difference indicates a difference in quantity of the substance dispensed from the receptacle, and determining that the second difference exceeds the threshold quantity of the substance indicating that the calibration is required and that the dispensation monitor is insufficiently accurate; and adjusting the dispensation monitor in response to determining that the second difference exceeds the threshold quantity.

16. The computer program product of claim 15, wherein adjusting the dispensation monitor comprises changing a correlation between the measured dispensation value and the reference dispensation value preventing a difference between the reference dispensation value and the measured dispensation value from exceeding the threshold quantity.

17. The computer program product of claim 15, wherein the dispensation monitor comprises a flow sensor, the flow sensor configured to measure the flow rates of the quantity of the substance passing through the dispensation monitor; wherein the measured dispensation value is based, at least in part, on the flow rates.

18. The computer program product of claim 15, wherein the dispensation monitor includes a temperature sensor, the temperature sensor configured to measure a temperature of an environment in which the receptacle is located.

19. The computer program product of claim 15, wherein the dispensation monitor includes a humidity sensor, the humidity sensor configured to measure a humidity of an environment in which the receptacle is located.

20. The computer program product of claim 15, wherein the dispensation monitor includes a shutter, wherein the shutter is configured transition between an open state and a closed state; wherein in the open state, the shutter allows the substance to dispense from the receptacle; and wherein in the closed state, the shutter inhibits the substance from dispensing from the receptacle; and based on determining that the second difference exceeds a second threshold quantity, transmitting a notice to a user of the manual dispenser to stop dispensing the substance from the receptacle, the second threshold quantity indicating the quantity of the substance dispensed exceeds the recommended quantity.

* * * * *